United States Patent [19]

Karol et al.

[11] Patent Number: 5,675,573
[45] Date of Patent: Oct. 7, 1997

[54] DELAY-MINIMIZING SYSTEM WITH GUARANTEED BANDWIDTH DELIVERY FOR REAL-TIME TRAFFIC

[75] Inventors: Mark John Karol, Fair Haven; Pramod Pancha, Somerset, both of N.J.

[73] Assignee: Lucent Technologies Inc., Murray Hill, N.J.

[21] Appl. No.: 408,758

[22] Filed: Mar. 22, 1995

[51] Int. Cl.⁶ .................................................. H04L 12/56
[52] U.S. Cl. ............................................. 370/230; 370/416
[58] Field of Search ........................ 370/60, 60.1, 79, 370/95.1, 94.1, 85.8, 85.2, 85.6, 85.7, 94.2, 395, 398, 412, 418, 413, 414, 415, 416, 420, 421, 429, 230; 340/825.5, 825.51, 825.08

[56] References Cited

U.S. PATENT DOCUMENTS

| | | | |
|---|---|---|---|
| 5,050,161 | 9/1991 | Golestani | 370/85.6 |
| 5,140,584 | 8/1992 | Suzuki | 370/85.6 |
| 5,150,358 | 9/1992 | Punj et al. | 370/85.6 |
| 5,231,633 | 7/1993 | Hluchyj et al. | 370/60 |
| 5,268,900 | 12/1993 | Hluchyj et al. | 370/85.6 |
| 5,390,176 | 2/1995 | Schoute et al. | 370/85.6 |
| 5,432,790 | 7/1995 | Hluchyj et al. | 370/94.1 |
| 5,499,238 | 3/1996 | Shon | 370/85.6 |

*Primary Examiner*—Benedict V. Safourek
*Assistant Examiner*—Chau T. Nguyen

[57] ABSTRACT

A bandwidth allocation system allows packets or cells within traffic flows from different sources contending for access to a shared processing fabric to get access to that fabric in an order that is determined primarily on individual guaranteed bandwidth requirements associated with each traffic flow, and secondarily on overall system criteria, such as a time of arrival, or due date of packets or cells within traffic flows.

14 Claims, 3 Drawing Sheets

DELAY-MINIMIZING SYSTEM WITH GUARANTEED BANDWIDTH DELIVERY FOR REAL-TIME TRAFFIC

TECHNICAL FIELD

This invention relates to a system for increasing performance of data networks, and more particularly to a method and a system for minimizing delays in such networks while delivering needed bandwidth to satisfy quality-of-service guarantees.

BACKGROUND OF THE INVENTION

Existing circuit-switched networks allocate fixed and guaranteed bandwidth to a requesting source for the duration of a connection, regardless of the amount of traffic flowing through that connection. The bandwidth-wasteful nature of circuit-switched networks is well known. Narrowband packet networks, by contrast, efficiently allocate bandwidth to a requesting source on a need-to-use basis, but typically do not support concrete guarantees of delivering a certain amount of bandwidth within a predetermined period of time, as dictated by Quality-of-Service (QoS) parameters. This limitation prevents the use of narrowband packet networks for real-time traffic whose stringent requirements for guaranteed bandwidth delivery are well known. Satisfying guaranteed bandwidth requests while minimizing delay in networks has received no attention from network designers primarily because it was more convenient to design separate networks for different applications (voice and data) with distinct optimization criteria for each type of network. However, with the impending deployment of high-speed packet data networks that will support voice, data and video applications on a common fabric, the issue of delivering guaranteed bandwidth to requesting sources while minimizing network delay is expected to take particular significance.

In an effort to address one aspect of this issue, some network planners have designed priority and packet-dropping schemes to meet QoS requirements and to route traffic based on the associated application requirements, as opposed to the order in which the traffic is received. Unfortunately, these schemes operate at the expense of low-priority sources or applications and sometimes result in allocation of resources in a haphazard fashion without adequate consideration for unused bandwidth that could be efficiently allocated to a lower-priority source. Realizing that the defining characteristic of a real-time traffic flow is its sensitivity to delay, other designers of fast packet networks have devised queuing and scheduling schemes to minimize excessive transport delays in order to reduce losses of packets and to minimize degradation in service quality. For example, fair queuing schemes have been devised for fast packet networks to support real-time traffic by specifying and guaranteeing an end-to-end delay bound for the duration of a session. This implies that admitting new traffic should not affect the delay bounds for the existing flows. This concept is known in the art as the "isolation" requirement for traffic flows. One of the drawbacks of the fair queuing schemes is the cost associated with the reduced sharing between flows of the system bandwidth. Specifically, the non-sharing of unused system bandwidth results in suboptimal system delay performance. Thus, it remains a problem of the prior art to guarantee that requesting sources obtain their desired service quality while achieving the best system delay performance.

SUMMARY OF THE INVENTION

The present invention is directed to a bandwidth allocation system in which the order of access to a shared processing fabric by traffic flows from different sources contending for access to that fabric is determined primarily on individual guaranteed bandwidth requirements associated with each contending flow, and secondarily on overall system criteria, such as a time of arrival, or due date of packets or cells within traffic flows.

In an embodiment of the principles of the invention, packets or cells from each flow (associated with a source, such as a bandwidth-requesting device, or a subnetwork) are queued in separate buffers while they await access to a processing fabric. In each time slot, a cell or packet at the head of any flow's buffer is eligible for access to the processing fabric. The access policy operates in two phases (which may be implemented, for example, as separate modules) to determine the order of service for cells or packets. In the first phase, the cells or packets that must be served in order to ensure that the requested bandwidth is delivered to each flow, are identified. These cells or packets are placed in a queue called the "Guaranteed Service Queue (GSQ)" and subsequently, one at a time, are allowed access to the processing fabric. Whenever the GSQ is empty in a time slot, the second phase becomes operative. In that phase, cells or packets get access to the processing fabric according to some predetermined criteria, such as a First-Come-First-Serve (FCFS) basis. For example, the oldest cell or packet among all flows may be served. This is accomplished by comparing the time of arrival into the system of the head-of-line cells in each flow. Advantageously, serving cells in FCFS order in this phase results in optimal system delay performance for that particular time slot. Alternatively, the Earliest Due Date (EDD) of cells or packets may dictate the order in which cells or packets are allowed access to the shared processing fabric when the GSQ is empty in a time slot.

DETAILED DESCRIPTION

Figure 1:
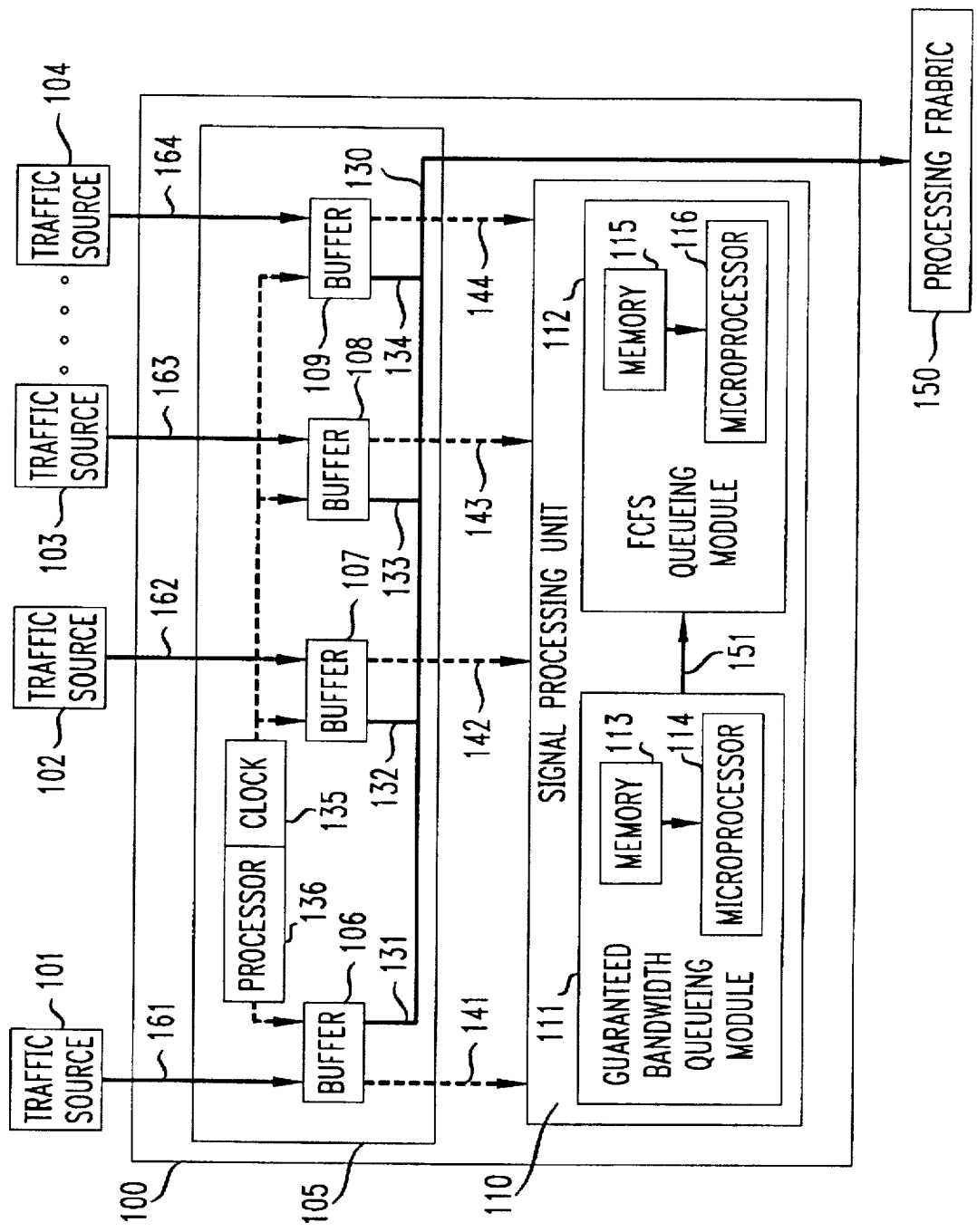
FIG. 1 shows a block diagram of an apparatus arranged to implement the principles of the invention.

FIG. 1 shows a block diagram of a controller arranged to implement the principles of the invention. The controller 100 depicted in FIG. 1 is comprised of modular components which include an input interface 105 and a signal processing unit 110.

Data enter the controller 100 via the input interface 105 which is the entry point for traffic sources 101–104 to get access to processing fabric 150. Traffic sources 101 to 104 may be either processing devices, such as data terminal equipment, or communications devices, such as data communications equipment. Those devices transmit digital input signals to input interface 105 according to some predetermined physical and link protocols. Alternatively, traffic sources 101 to 104 may be sub-networks contending for access to a shared backbone network represented by processing fabric 150. In the latter case, traffic sources 101 to 104 may be line concentrators which multiplex digital signals from different traffic flows over access carrier facilities 161 to 164 terminated on input interface 105.

When traffic sources 101, 102, 103 and 104 send digital signals in the form of cells or group of cells, for example, to controller 100, the latter temporarily stores the received cells in buffers 106 to 109 which operate as queuing storage devices for cells within a flow of traffic from each traffic source. Thus, cells from each traffic source are queued in separate buffers while they await access to processing fabric 150. Alternatively, buffers 106 to 109 may be included in traffic sources 101 to 104. The queuing scheme implemented in buffers 106 to 109 forms no part of the invention. Of significance is the fact that in each time slot only the cells at the head of each buffer queue associated with each traffic source is eligible to contend for access to processing fabric 150. Associated with each traffic source i is a counter $r_i$ whose value could be based on the QoS parameters for that traffic flow.

Input interface 105 also includes a processor 136 which uses the timing signals of a clock 135 to synchronize the contention cycle for cells in each buffer. Thus, when a cell in a buffer becomes eligible for contention, processor 136 uses clock 135 to timestamp the eligible cell. At the beginning of a contention cycle, each buffer with a with a new head-of-line cell to transmit to processing fabric 150 sends a contention code to signal processing unit 110 via one of the signaling links 141 to 144. The contention code may indicate, for example, the Quality-of-Service (QoS) parameters associated with the cell, the value of the counter associated with the traffic flow for that cell, and the time at which the cell either became eligible for contention or was received by input interface 105.

Also shown in FIG. 1 is signal processing unit 110 that includes a Guaranteed Bandwidth Queuing module 111 and a First-Come-First-Serve (FCFS) queuing module 112. At the heart of Guaranteed Bandwidth Queuing module 111 is a microprocessor 114, which operates as the first gatepost for traffic contending for access to processing fabric 150. Specifically, microprocessor 114 executes programmed instructions stored in memory 113 to assess the QoS parameters for contending traffic flows, to determine the guaranteed bandwidth requested by each contending traffic flow, to examine the bandwidth available at processing fabric 150 and to decrement a counter, as needed. This aspect of the invention is explained in further detail below. When microprocessor 114 determines that extra bandwidth is still available on processing fabric 150 after all guaranteed requested bandwidth for all contending traffic flows can be satisfied for the current time slot, it notifies FCFS queuing module 112 through a signal transmitted over signaling link 151. Microprocessor 116 of FCFS queuing module 112 executes programmed instructions stored in memory 115. Those instructions include means for assessing, for example, the age or due date of cells within a contending traffic flow. As explained in further detail below, microprocessor 116 analyzes the "contending age" of each traffic flow to determine which one of the contending traffic flows should get access first to processing fabric 150 when excess capacity is available on processing fabric 150. It is worth noting that although a First-Come-First-Serve (FCFS) scheduling arrangement is indicated for queuing module 112, other prior art arrangements, such as Hierarchical Round Robin (HRR), Weighted Round Robin (WRR), to name a few, could be used as well. In summary, when excess capacity is available on processing fabric 150, signaling processing unit 110 allows controller 100 to implement, for example, a first-in first-out queuing management algorithm using the capabilities of FCFS queuing module 112. At all times, even when bandwidth is not scarce, signaling processing unit 110 allows controller 100 to isolate traffic flows in order to deliver guaranteed requested bandwidth using the capabilities of guaranteed bandwidth queuing module 111.

When a cell within a traffic flow is determined by signal processing unit 110 to be the "winner" for a contending cycle or time slot, signal processing unit 110 sends a supervisory signal to input interface 105 for the latter to retrieve from one of its buffers 106–109, the winning cell for transmission to processing fabric 150 via one of the signal buses 131 through 134 and system bus 130. Specifically, signal processing unit 110 sends a supervisory signal to processor 136 to establish a data path from the buffer selected by microprocessors 114 and 116 to processing fabric 150 for the transmission of the winning cell to processing fabric 150. Processing fabric 150 may be an output link, a processor, a backbone network or a communications switch adhering, for example, to the Asynchronous Transfer Mode (ATM) protocol standard.

Figure 2:
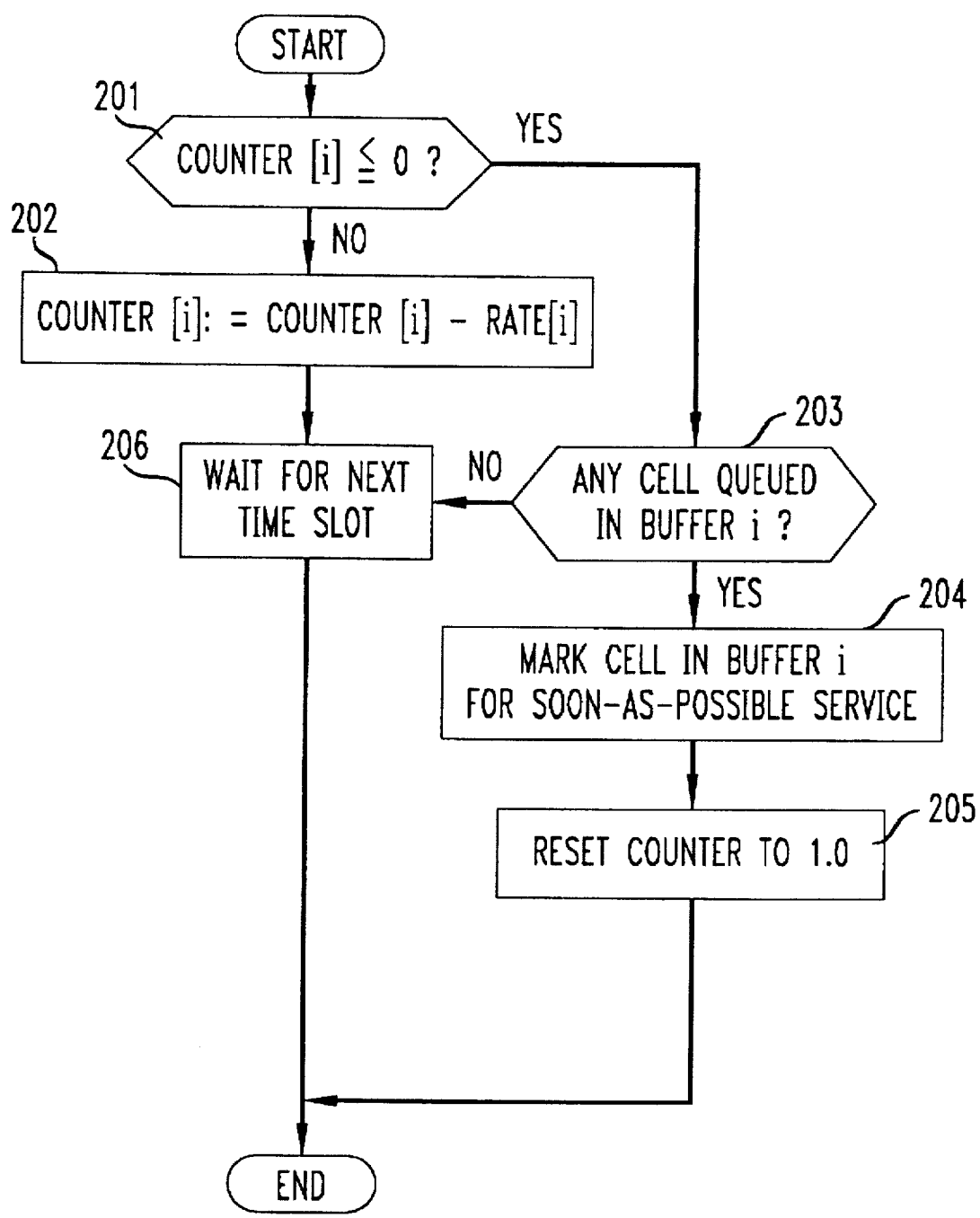
FIGS. 2 and 3 are flow diagrams of programmed instructions executed in a processor of the apparatus of FIG. 1 to implement the principles of the invention.

FIG. 2 is a flow diagram of illustrative programmed instructions executed by microprocessor 114 of the guaranteed queuing module to implement the guaranteed bandwidth feature of the invention. At the beginning of each time slot, microprocessor 114 in signaling processing unit 110 analyzes the counter in a selected buffer for a traffic source to determine whether that counter is less than or equal to zero, as shown in step 201. This step may be performed concurrently for each of the traffic sources. If the counter is less than or equal to zero, as determined in step 201, then, microprocessor 114 assesses in step 203 whether any cells are queued in the selected buffer. If so, microprocessor 114, in step 204, marks the next cell in the queue in the selected buffer for soon-as-possible service by sending an appropriate supervisory signal to processor 136. Alternatively, step 204 may be performed by microprocessor 114 queuing the cell (at the head of the queue in the selected buffer) in memory 113 for subsequent transmission to processing fabric 150. In this alternative implementation, memory 113 is a physical Guaranteed Service Queue (GSQ), as opposed to the logical Guaranteed Service Queue that is implemented when a contending cell is marked for soon-as-possible service. Regardless of the implementation selected (marking or queuing), a counter (called a "Guaranteed Service Queue counter") is updated whenever a cell is marked or queued to keep track of the number of cells waiting for soon-as-possible transmission to processing fabric 150.

Thereafter, microprocessor 114, in step 205, resets the counter to 1.0 and increments a bandwidth usage counter for the traffic flow or the traffic source. This allows an operator of controller 100 to determine the number of cells from a flow or a traffic source that have been served over a time period thereby providing a billing mechanism, and a means for verifying the bandwidth guarantees for each traffic source.

Advantageously, a design implementing the principles of the invention ensures that whenever a counter i is reset to 1.0, the value of counter i will reach 0.0 or less in $1/r_i$ slots and the next cell to arrive from flow i will promptly be marked for immediate service. As a result, flow i is guaranteed the bandwidth that it requests. In an actual implementation of the invention, the $r_i$ for all flows must be chosen such that their sum is less than 1.0 in order for the service policy to be stable. By considering the sum of the $r_i$, controller 100 can also rapidly decide whether or not a new flow should be accepted.

When the counter i in a buffer associated with a traffic source is not equal to or less than zero, the counter is decremented by a fixed value called the "counter rate $r_i$", as shown in step 202. In that case, the cells queued in the selected buffer have to wait for the next time slot, as indicated in step 206. The value $r_i$ is calculated based on the guaranteed bandwidth requested by flow ι, and is equal to the fraction of the processing fabric 150 that needs to be allocated to flow ι. For example, if flow ι requests guaranteed bandwidth equal to one-tenth the capacity of the processing fabric 150, then the value used for $r_i$ is 0.1. By way of example, when processing fabric 150 is an Asynchronous Transfer Mode (ATM) switching fabric with a 155 Mb/s bus, the counter rate $r_i$ for typical services may be estimated as 0.04 for 6 Mb/s MPEG-2 entertainment video, 0.002 for a 384 kb/s CD quality audio, and 0.006 for a file transfer session which requires a 100 kb/s minimum throughput.

Figure 3:
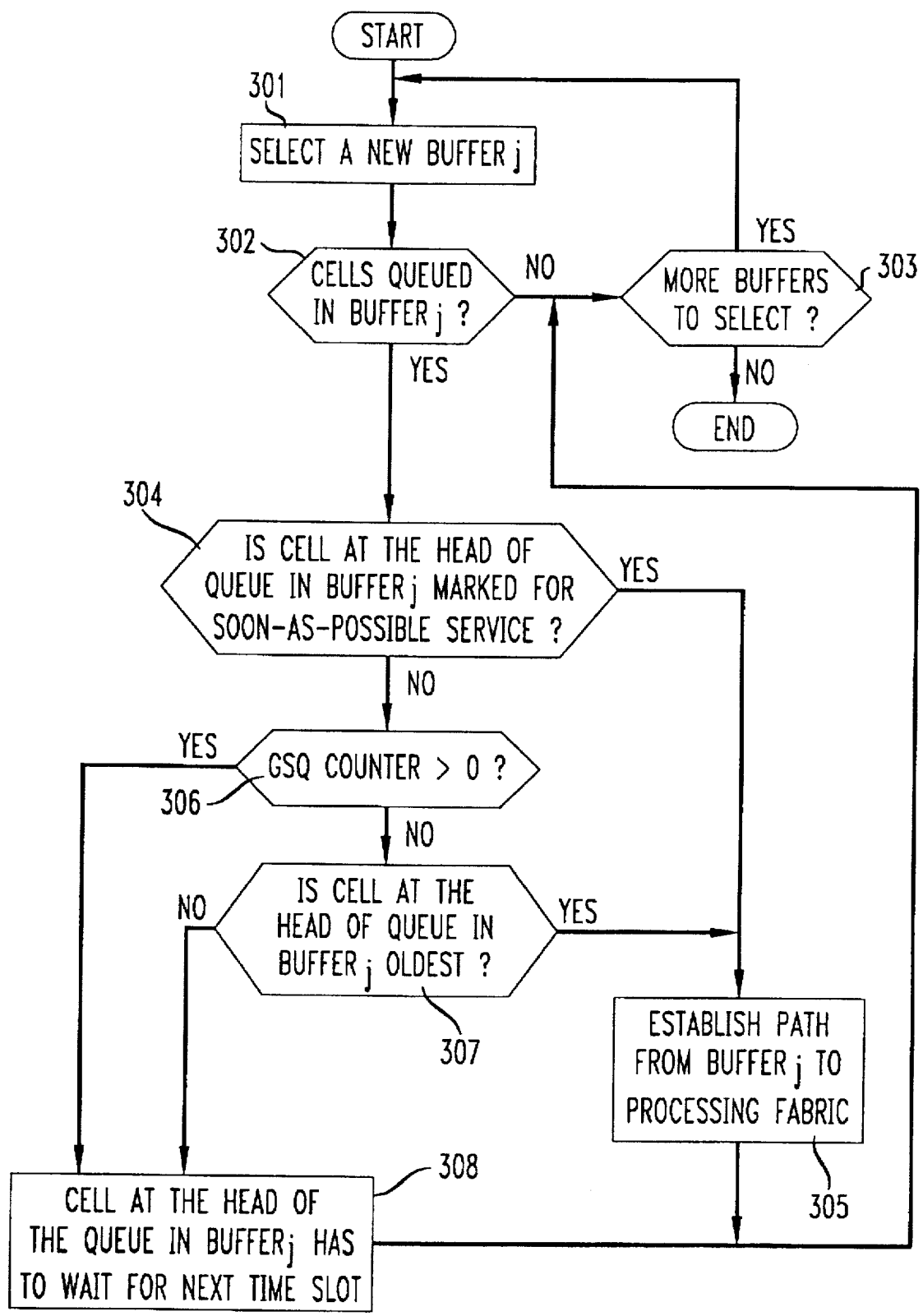

FIG. 3 is a flow diagram of exemplary programmed instructions executed by the processors of the signal processing unit 110 of FIG. 1 to implement the principles of the invention. The process contemplated by the invention is initiated in step 301, when microprocessor 114 selects a new buffer j to determine whether the buffer contains any cell that needs to be transmitted within the current time slot. If the buffer j is empty (i.e., no cells are queued therein), as determined in step 302, microprocessor 114 assesses whether there are remaining buffers to be selected, as indicated in step 303. If so, a new buffer j, is selected and its content analyzed for presence of queued cells, as described in steps 301 and 302. If one or more cells are queued in the selected buffer, as determined in step 302, the cell at the head of the queue in the selected buffer counter associated with the traffic flow in the selected buffer is analyzed to determine, in step 304, whether that cell is marked for as-soon-as-possible service (as outlined in FIG. 2). If so, microprocessor 114, in step 305, sends a signal to processor 136 to retrieve from the selected buffer the cell at the head of the queue for transmission to processing fabric 150.

When the cell at the head of the queue is not marked for as-soon-as-possible service, as determined in step 304, then microprocessor 114, in step 306, inquires whether the GSQ counter is greater than zero. If so, the cell at the head of the queue in the selected buffer must wait for the next time slot to contend for access to processing fabric 150, as indicated in step 308. In that case, the counter associated with the traffic flow for that buffer is decremented by the counter rate $r_i$, as described above (step 202 of FIG. 2). If the GSQ counter is not equal to zero, as determined in step 306, microprocessor 116 assesses, in step 307 whether the cell at the head of the queue in the selected buffer is the oldest cell among all cells in all buffers. If so, microprocessor 116 sends a signal to processor 136 to retrieve from the selected buffer the cell at the head of the queue for transmission to processing fabric 150. Otherwise, the cell at the head of the queue in the selected buffer must wait for the next time slot to contend for access to processing fabric 150, as indicated in step 308.

Advantageously, prior art packet-dropping, and priority schemes may be implemented in conjunction with the guaranteed bandwidth feature of the invention.

The foregoing is to be construed as only being an illustrative embodiment of this invention. Persons skilled in the art can easily conceive of alternative arrangements providing functionality similar to this embodiment without any deviation from the fundamental principles or the scope of this invention.

We claim:

1. A method of allocating bandwidth within a contention cycle to information packets originating from traffic sources competing for access to a data network, the method comprising the steps of:

receiving the information packets from the traffic sources and storing the information packets in one or more source queues, each of the stored information packets having a respective predefined quality of service parameter;

assigning any information packet stored in one of the source queues and having a quality of service parameter greater than a predetermined value to a guaranteed service queue;

allocating bandwidth of the data network to at least one of the information packets assigned to the guaranteed service queue; and if the guaranteed service queue is empty, allocating the bandwidth to the information packets stored in the source queue according to a predetermined criterion.

2. The method of claim 1 wherein said predetermined criterion is determined on a first-come-first-serve basis.

3. The method of claim 1 wherein said traffic sources are respective sub-networks.

4. A method of allocating bandwidth within a contention cycle to information packets originating from traffic sources competing for access to a data network, the method comprising the steps of:

receiving the information packets from the traffic sources and storing the information packets in one or more source queues, each of the stored information packets having a respective predefined quality of service parameter;

assigning any information packet having a quality of service parameter greater than a predetermined value to a guaranteed service queue;

allocating bandwidth of the data network to one of the information packets assigned to the guaranteed service queue;

if the guaranteed service queue is empty, allocating the bandwidth to the remaining information packets according to a predetermined criterion;

assigning a counter of a predetermined value to each traffic source;

decrementing said counter by a counter rate determined as a function of the data network bandwidth that is to be allocated to the traffic source to satisfy the quality of service assigned to the traffic source, said decrementing step taking place only when a contending information packet from one of said traffic sources cannot be allocated bandwidth of the data network within a time slot; and allocating said bandwidth to an information packet received from one of the traffic sources if the counter assigned to that traffic source is less than or equal to zero.

5. The invention of claim 4 further comprising the step of:

resetting the counter assigned to a respective one of the traffic sources to a predetermined value when said bandwidth is allocated to an information packet originating from that traffic source.

6. The invention of claim 1 wherein said data network is a switching system.

7. A communications apparatus comprising:

a plurality of queuing means for storing information packets received from a plurality of traffic sources contending for access to a shared fabric;

means for reassigning one of said stored information packets to a guaranteed service queue for as-soon as possible access to the shared fabric, the selection being based on a predetermined service guarantee associated with that one of said traffic sources from which said one of said information packets was received;

means, responsive to a signal indicative of unused bandwidth on the shared fabric after said one of said information packets has accessed the shared fabric, for allocating bandwidth to another one of the stored information packets based on a predetermined criterion.

8. The invention of claim 7 wherein said predetermined criterion is selected from a group consisting of a first-come-first-serve criterion and earliest-due-date of information packet criterion.

9. The invention of claim 7 wherein said traffic sources are subnetworks and said shared fabric is a backbone network.

10. A communications apparatus comprising:

a plurality of queuing means for storing information packets received from a plurality of traffic sources contending for access to a shared fabric;

means for reassigning one of said stored information packets to a guaranteed service queue for as-soon as possible access to the shared fabric, the selection being based on a predetermined service guarantee associated with that one of said traffic sources from which said one of said information packets was received;

means, responsive to a signal indicative of unused bandwidth on the shared fabric after said one of said information packets has accessed the shared fabric, for allocating bandwidth to another one of the stored information packets based on a predetermined criterion;

means for assigning a counter of a predetermined value to each of said traffic sources;

means for decrementing said counter by a counter rate that is determined as a function of the bandwidth that needs to be allocated to the respective traffic source to satisfy the associated service guarantee, said decrementing means being operative only when a contending information packet from another one of said traffic sources cannot granted access to the shared fabric within a time slot; and allocating said bandwidth of the shared fabric to an information packet received from one of the traffic sources if the counter for that traffic source is a less than or equal to zero.

11. The invention of claim 10 further comprising means for resetting the counter assigned to a respective one of the traffic sources to the predetermined value when the bandwidth of the shared fabric is allocated to an information packet from that traffic source.

12. A method of allocating bandwidth of a shared fabric to information packets within traffic flows, said information packets being received from respective traffic sources contending for access to the shared fabric, the method comprising the steps of:

storing the information packets in data queues as they are received from said sources, evaluating contending stored information packets received within a traffic flow from respective traffic sources in which said evaluating is based on predetermined bandwidth guarantees associated with said traffic flow;

allocating bandwidth to at least one stored information packet based on said evaluation by associating the at least one stored information packet with a guaranteed service queue; and if unused bandwidth is still available on said shared fabric allocating bandwidth to at least one other stored information packet based on at least one predetermined criterion.

13. A method of allocating bandwidth of a shared fabric to information packets within traffic flows, said information packets being received from respective traffic sources contending for access to the shared fabric, the method comprising the steps of:

evaluating contending information packets received within a traffic flow from respective traffic sources in which said evaluating is based on predetermined bandwidth guarantees associated with said traffic flow;

allocating bandwidth to at least one information packet based on said evaluation;

if unused bandwidth is still available on said shared fabric allocating bandwidth to at least one other information packet based on at least one predetermined criterion;

determining a value of a counter associated with each of said traffic sources; and allocating bandwidth to a contending information packet if said counter for the respective one of said traffic sources from which said contending information packet was received is less than or equal to zero.

14. The method of claim 13 further comprising the step of:

decrementing the counter for said respective source traffic source by a counter rate that is determined as a function of the bandwidth that needs to be allocated to that traffic source to satisfy the associated bandwidth service guarantees.

* * * * *